United States Patent [19]

An

[11] Patent Number: 5,030,880

[45] Date of Patent: Jul. 9, 1991

[54] SHADOW MASK FOR COLOR CATHODE RAY TUBE

[75] Inventor: Min-ho An, Seoul, Rep. of Korea

[73] Assignee: Samsung Electron Devices Co., Ltd., Kyunggi, Rep. of Korea

[21] Appl. No.: 440,345

[22] Filed: Nov. 22, 1989

[51] Int. Cl.[5] ........................ H01J 29/07; G03B 41/00

[52] U.S. Cl. .................................... 313/403; 313/408; 354/1

[58] Field of Search ........................ 313/402, 403, 408; 354/1; 430/5

[56] References Cited

U.S. PATENT DOCUMENTS 3,652,895 3/1972 Tsuneta et al. ...................... 313/403
4,296,189 10/1981 Kuzminski ....................... 313/403 X

*Primary Examiner*—Sandra L. O'Shea
*Attorney, Agent, or Firm*—Morgan & Finnegan

[57] ABSTRACT

A shadow mask for a color cathode ray tube is disclosed. The shadow mask has pin cushion type apertures or drum type apertures mixed with slit type apertures. When the shadow mask is used as an exposing mask, the pin cushion type apertures may be provided at the portions where fewer light beams are required, and the drum type apertures may be provided at the portions where more light beams are required. The maximum width of the pin cushion type apertures is preferably about the same as the width of the slit type apertures, while the minimum width of the drum type apertures is preferably about the same as the width of the slit type apertures. According to the disclosed device, the photo sensitivity differences between the exposed portions of the whole panel may be reduced. Thus, the formation of black matrices becomes uniform, thereby enabling the production of high quality cathode ray tubes.

1 Claim, 3 Drawing Sheets

SHADOW MASK FOR COLOR CATHODE RAY TUBE

FIELD OF THE INVENTION

The invention relates to a shadow mask for a color cathode ray tube. More particularly, the invention relates to a shadow mask which is used as an exposing mask.

BACKGROUND OF THE INVENTION

In a color cathode ray tube, which is provided with an in-line type electron gun, the phosphor that constitutes the phosphor screen should be formed in the form of stripes. A black matrix, made of a light absorbing material such as graphite, is provided between the phosphor stripes in order to prevent the lowering of the luminance due to external light rays.

The phosphor stripes and the black matrix are typically formed through the use of a photo sensitive synthetic resin based on a photo etching method, i.e., based on exposure and development. In this situation, a shadow mask which guides the electron beams in a completed color cathode ray tube is generally used as the exposing mask. Such a conventional shadow mask is shown in FIG. 1. The shadow mask 1' is provided with numerous slit type apertures 2 having a width h.

FIG. 2 illustrates an exposing device and a method of exposing the inner face of a panel 5 using the shadow mask 1' as the exposing mask. This exposing device is constituted such that the shadow mask 1', acting as the exposing mask, is installed in the interior of the panel 5 and is coated with a photo sensitive material. A shutter having a slit *7a* is moved in the direction of the shorter side of the panel 5, so that the inner face of the panel 5 will be exposed in a stepwise manner through the use of light rays radiated from a light source 6. Continuous black matrices and phosphor stripes are thereby formed.

However, the respective distances from the light source 6 to various points on the panel 5 are different from one another, and therefore, the illuminances at the different points on the panel become different from one another. As a result, the levels of exposure also become different from one another.

Accordingly, the state of the black matrices and the phosphor stripes formed on the inner face of the panel 5 may be deficient. For example, the black matrices, which are usually formed before the phosphor stripes, may create peeling at the exposed portions. Thus, as shown in FIG. 3A, in cases where the exposure is insufficient, the widths of the black matrices B may be irregularly expanded relative to the standard widths. In cases where the exposure is excessive, the widths of the black matrices B may be irregularly narrowed as shown in FIG. 3B, so that the linearity of the black matrices B is aggravated. If the linearity of the black matrices B is aggravated, then the phosphor stripes formed between the black matrices are also correspondingly aggravated.

One prior attempt to overcome such disadvantages is disclosed in Japanese Utility Model Publication No. 58-41633, in which efforts are made primarily to modify the shape of the slit of the shutter. However, this modification has not properly solved the above described problem.

SUMMARY OF THE INVENTION

The present invention is intended to overcome the above described disadvantages.

It is therefor an object of the present invention to provide a shadow mask for a color cathode ray tube, in which the exposures can be made uniform over the entire surface of the panel when performing exposures using an exposing mask.

In achieving this result, a shadow mask for a color cathode ray tube according to the present invention is provided, comprising a shadow mask containing numerous apertures for guiding the electron beams. The apertures include either pin cushion type apertures or drum type apertures mixed with slit type apertures.

BRIEF DESCRIPTION OF THE DRAWINGS

The above result, as well as other advantages of the present invention, will become more apparent by describing the preferred embodiment of the present invention with reference to the attached drawings, in which.

DESCRIPTION OF THE PREFERRED EMBODIMENT

Figure 4A:
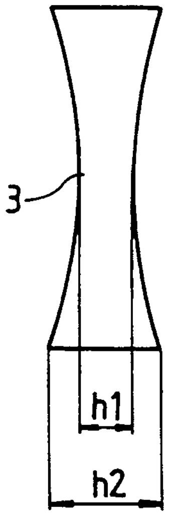
FIG. 4A is a schematical view of a pin cushion type aperture formed on a shadow mask, according to the present invention.
Figure 4B:
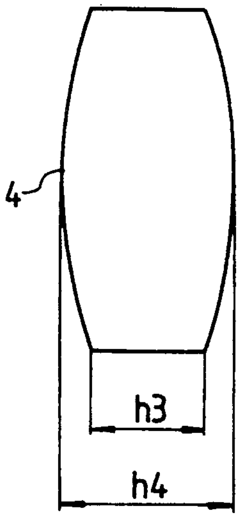
FIG. 4B is a schematical view of a drum type aperture formed on a shadow mask, according to the present invention.

FIGS. 4A and 4B illustrate the shape of apertures provided on a shadow mask according to the present invention. FIG. 4A shows a pin cushion type aperture and FIG. 4B shows a drum type aperture.

Figure 1:
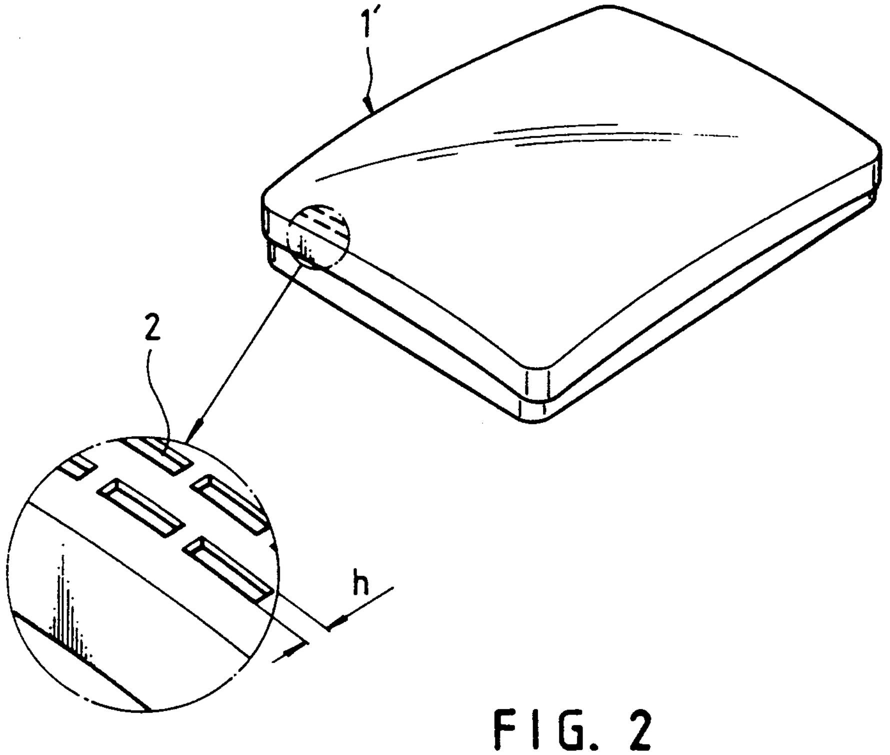
FIG. 1 (Prior Art)
FIG. 1 is a perspective view showing the structure of a conventional shadow mask frame, with a portion enlarged.

The pin cushion aperture 3 (FIG. 4A) has a minimum width h1 and a maximum width h2. The drum type aperture 4 (FIG. 4B) has a minimum width h3 and a maximum width h4. The maximum width h2 of the pin cushion type aperture 3 and the minimum width h3 of the drum type aperture 4 should preferably be formed in almost the same size as the width h of a usual slit type aperture 2 (FIG. 1). Accordingly, the area of the open portion of the pin cushion type aperture 3 becomes smaller than that of the slit type aperture 2, while the area of the open portion of the drum type aperture 4 becomes larger than that of the slit type aperture 2.

It should be noted that if the minimum width hl of the pin cushion type aperture 3 or the maximum width h4 of the drum type aperture 4 are made to be approximately the same as the width h of the slit type aperture 2, then the relationship between the areas of the open portions will become contrary to the preferred embodiment and will likely not be a desirable form. This is because arrangement of such a configuration into an "in-line" state becomes difficult when used in combination with the slit type apertures 2.

Figure 5A:
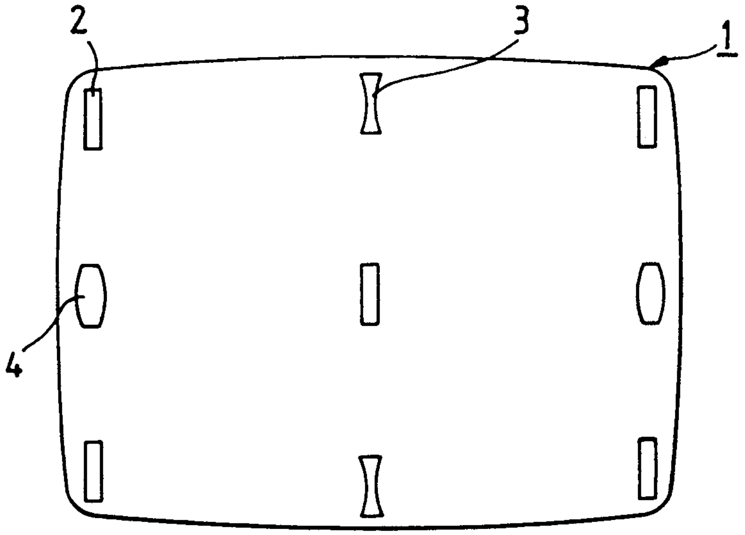
FIGS. 5A and 5B show illustrative embodiments for shadow masks according to the present invention.
Figure 5B:
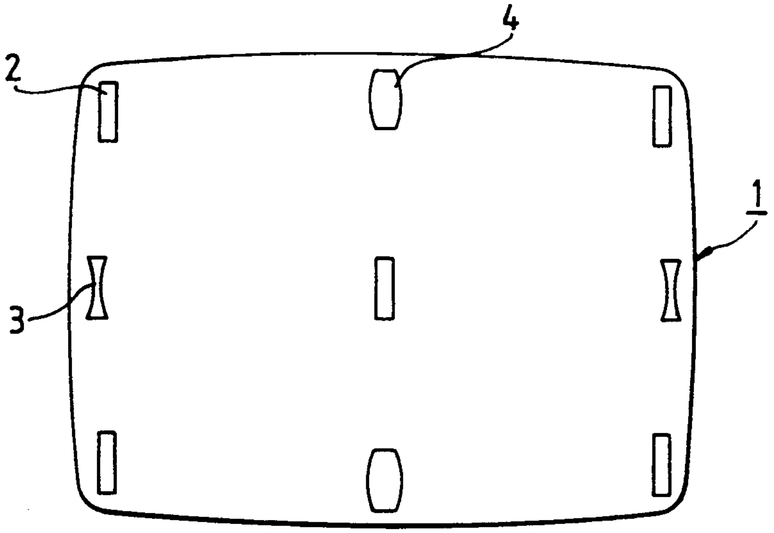

As shown in FIGS. 5A and 5B, various types of apertures according to the present invention may be mixed to provide a shadow mask 1. For example, if the exposure at the outer middle portion of the longer side of the panel exceeds a reference value, then the pin cushion type apertures 3 may be provided for the outer middle portion of the longer side of the panel where the exposure is excessive. The drum type apertures 4 may be provided for the outer middle portion of the shorter side where the exposure is insufficient. A reverse case is illustrated in FIG. 5B.

Under such conditions, it is desirable that the maximum width h2 of the pin cushion type aperture 3 be designed to have almost the same size as the width of the slit type apertures 2 as described above. In accordance with the degree of insufficiency of the exposures, the minimum width hl may be gradually increased until the shape of the aperture is made to be almost the same as the slit type aperture 2 upon reaching the portion where exposure becomes equivalent to the reference value. Further, the drum type apertures 4 should be desirably provided in a manner of gradually decreasing the maximum width h4.

The operation of the shadow mask of the present invention as described above will now be described.

A shadow mask according to the present invention may be used as an exposing mask for exposing the inner face of the panel after it is installed. As a matter of convenience, the description will refer to the formation process for the black matrices, but the explanation is also applicable to the case of the formation process of the phosphor stripes.

Figure 2:
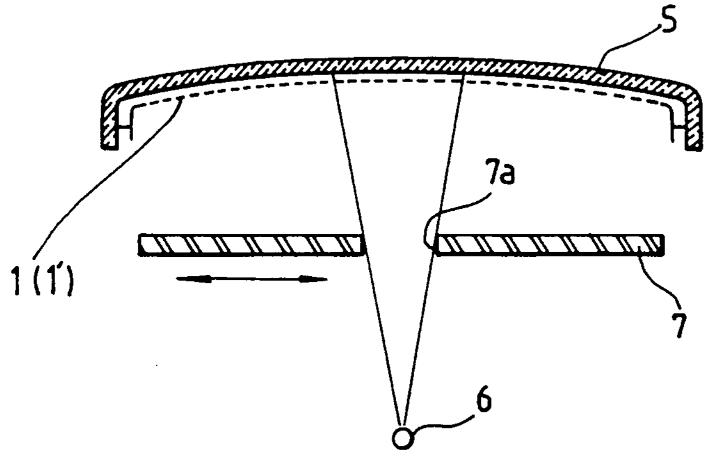
FIG. 2 is a schematical, sectional view of a conventional exposing device.
Figure 3A:
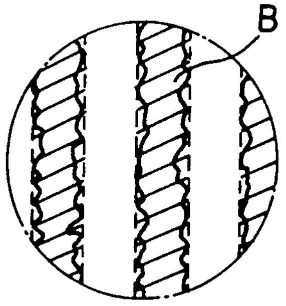
FIG. 3A is an enlarged plan view of the inner face of a panel showing a defective formation of black matrices in a case where the exposure is insufficient.
Figure 3B:
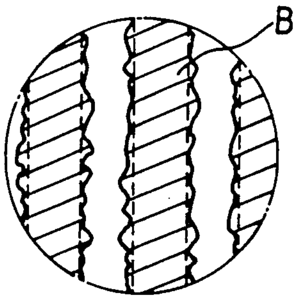
FIG. 3B is an enlarged plan view of the inner face of the panel corresponding to FIG. 3A but in a case where the exposure is excessive.

If light rays are irradiated from the light source 6 (FIG. 2), then the light beams will expose the inner face of the panel 5 in a stepwise manner through the slit 7*a* of the moving shutter 7. This will produce the same effect as moving apertures 2, 3, and 4 respectively over the inner face of the panel in the lengthwise direction. Accordingly, the exposure levels for the different positions of the stripes formed on the panel 5 will be controlled.

In the case of the pin cushion type aperture 3 in which the area of its opening portion is smaller than that of the usual slit type aperture 2, the average amount of light passing through is reduced. In the drum type apertures 4, the opposite is true. As a result, the intensity of the light beams arriving at the respective portions of the inner face of the panel 5 becomes almost uniform, thereby making uniform the overall exposure for the whole panel.

Accordingly, the photo sensitivity differences between the exposed portions of the whole panel are reduced. Therefore, the formation state of the black matrices, and particularly the linearity and the density of the black matrices, become uniform.

Thus, the adoption of the shadow mask according to the present invention yields good quality phosphor layers, thereby making it possible to produce high quality color cathode ray tubes capable of giving improved images.

Although the invention has been described above in detail by way of reference to the disclosed embodiments, it should be understood that the invention is not limited to the disclosed embodiments but should only be interpreted by way of reference to the claims which follow.

What is claimed is:

1. A shadow mask for a color cathode ray tube having numerous apertures for guiding electron beams, said mask comprising:

a first portion in which said apertures are configured as either pincushion type apertures, drum type apertures, or a combination of said pincushion and drum type apertures, and a second portion wherein said apertures are configured as slit type apertures, wherein said pincushion type apertures and said drum type apertures respectively have maximum and minimum widths, and said slit type apertures have a predetermined width, and wherein said maximum width of said pincushion type apertures and said minimum width of said drum type apertures are substantially the same respectively as said width of said slit type apertures, and wherein in at least one portion having said pincushion type apertures and/or said drum type apertures, the minimum widths of said pincushion type apertures and/or the maximum widths of said drum type apertures vary gradually to become substantially equal to the width of said slit type apertures.

* * * * *